United States Patent
Nishida

(10) Patent No.: US 9,587,515 B2
(45) Date of Patent: Mar. 7, 2017

(54) BEARING DEVICE FOR TURBOCHARGER

(75) Inventor: Hideaki Nishida, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 554 days.

(21) Appl. No.: 14/125,810

(22) PCT Filed: Jun. 22, 2012

(86) PCT No.: PCT/JP2012/066000
§ 371 (c)(1),
(2), (4) Date: Jan. 2, 2014

(87) PCT Pub. No.: WO2013/002142
PCT Pub. Date: Jan. 3, 2013

(65) Prior Publication Data
US 2014/0119898 A1    May 1, 2014

(30) Foreign Application Priority Data

Jun. 30, 2011 (JP) ................................. 2011-145797

(51) Int. Cl.
*F01D 17/16* (2006.01)
*F01D 25/16* (2006.01)
(Continued)

(52) U.S. Cl.
CPC ........... *F01D 25/16* (2013.01); *F01D 25/166* (2013.01); *F01D 25/18* (2013.01); *F01D 25/22* (2013.01);
(Continued)

(58) Field of Classification Search
CPC .......... F01D 25/16; F01D 25/18; F16C 17/18; F16C 17/02; F16C 33/1065; F16C 33/043;
(Continued)

(56) References Cited

U.S. PATENT DOCUMENTS 4,358,253 A * 11/1982 Okano .................. F01D 25/166
384/368
4,479,728 A * 10/1984 Miller .................. F01D 25/168
384/369
(Continued)

FOREIGN PATENT DOCUMENTS

CN         1530559 A    9/2004
CN       101415804 A    4/2009
(Continued)

OTHER PUBLICATIONS

Chinese Office Action dated May 6, 2015 issued in the corresponding Chinese Application No. 201280027265.X with an English translation.
(Continued)

*Primary Examiner* — Ninh H Nguyen
(74) *Attorney, Agent, or Firm* — Birch, Stewart, Kolasch & Birch, LLP

(57) ABSTRACT

It is intended, with respect to a first floating bush bearing disposed on a compressor housing side and a second floating bush bearing disposed on a turbine housing side, to improve oscillation stability when a turbine rotor revolves at a high speed, reduce the number of parts, and facilitate processing and assemblability. Provided are a bearing housing (13) for a turbocharger (1), a rotor shaft (16) passing through the bearing housing (13), a first floating bush bearing (17) interposed between the bearing housing (13) and the rotor shaft (16) and disposed on a compressor housing (12) side and comprising a first floating bush, and a second floating bush bearing (18) that has the same shape as the first floating bush bearing (17) and is disposed on a turbine housing (11) side and comprises a second floating bush (20). The inner bearing width (Li) of the first and second floating bushes is
(Continued)

formed to be smaller than the outer bearing width (Lo) by the same proportion in both bushes.

2 Claims, 4 Drawing Sheets

(51) Int. Cl.
F01D 25/18 (2006.01)
F02M 55/00 (2006.01)
F01D 25/22 (2006.01)
F02B 39/14 (2006.01)
F16C 17/18 (2006.01)
F16C 27/02 (2006.01)
F16C 17/02 (2006.01)
F16C 33/04 (2006.01)
F16C 33/10 (2006.01)

(52) U.S. Cl.
CPC ............. F02B 39/14 (2013.01); F02M 55/00 (2013.01); F16C 17/18 (2013.01); F16C 27/02 (2013.01); F05D 2220/40 (2013.01); F05D 2240/54 (2013.01); F05D 2250/61 (2013.01); F16C 17/02 (2013.01); F16C 33/043 (2013.01); F16C 33/1065 (2013.01); F16C 2202/54 (2013.01); F16C 2206/04 (2013.01); F16C 2240/40 (2013.01); F16C 2360/24 (2013.01)

(58) Field of Classification Search
CPC .............. F16C 2202/54; F16C 2206/04; F16C 2240/40; F05D 2240/54
See application file for complete search history.

(56) References Cited

U.S. PATENT DOCUMENTS

| 4,640,630 | A | | 2/1987 | Yoshioka et al. | |
|---|---|---|---|---|---|
| 4,969,805 | A | * | 11/1990 | Romeo | F01D 25/24 417/360 |
| 5,207,566 | A | * | 5/1993 | Munkel | F01D 25/164 417/407 |
| 7,132,936 | B1 | * | 11/2006 | Norton | G01P 7/00 324/207.25 |
| 7,793,499 | B2 | * | 9/2010 | Gutknecht | F01D 25/166 184/6.11 |
| 2003/0128903 | A1 | | 7/2003 | Yasuda et al. | |
| 2010/0234254 | A1 | | 9/2010 | Koshima et al. | |

FOREIGN PATENT DOCUMENTS

| DE | 103 11 202 A1 | 10/2004 |
|---|---|---|
| DE | 10 2009 007 696 A1 | 8/2010 |
| EP | 2 011 853 A1 | 1/2009 |
| EP | 2 085 578 A2 | 8/2009 |
| JP | 57-129919 A | 8/1982 |
| JP | 59-184327 U | 12/1984 |
| JP | 62-37625 U | 3/1987 |
| JP | 63-4056 A | 1/1988 |
| JP | 5-36995 Y2 | 9/1993 |
| JP | 8-74851 A | 3/1996 |
| JP | 2000-87961 A | 3/2000 |
| JP | 2002-138846 A | 5/2002 |
| JP | 2003-13710 A | 1/2003 |
| JP | 2006-90402 A | 4/2006 |
| JP | 2007-46642 A | 2/2007 |
| JP | 2008-190680 A | 8/2008 |
| JP | 2009-7935 A | 1/2009 |
| JP | 2009-156333 A | 7/2009 |
| JP | 2010-43680 A | 2/2010 |
| JP | 2010-116944 A | 5/2010 |
| JP | 2010-138757 A | 6/2010 |
| WO | WO 2007/119400 A1 | 10/2007 |

OTHER PUBLICATIONS

Notice of Allowance effective Jan. 7, 2016 issued in corresponding Chinese Application No. 201280027265.X with an English Translation.

Decision to Grant a Patent effective Jan. 22, 2015 issued in corresponding JP Application No. 2011-145797 with an English Translation.

Extended European Search Report effective Feb. 11, 2015 issued in corresponding EP Application No. 12803917.9.

* cited by examiner

BEARING DEVICE FOR TURBOCHARGER

TECHNICAL FIELD

The present invention relates a floating bush bearing which is suitable for a rotary machine having a high-speed rotation shaft, such as a turbocharger.

BACKGROUND ART

A floating bush bearing includes a floating bush rotatably provided in a space between a rotation shaft and a bearing housing. The floating bush bearing is configured so as to supply pressurized lubricating oil from the bearing housing to a space between an inner peripheral surface of the bearing housing and an outer peripheral surface of the floating bush and also to a space between an inner peripheral surface of the floating bush and the rotation shaft via an oil supply path provided in the floating bush in the radial direction.

The floating bush bearing is configured to support the rotation shaft stably while suppressing its oscillation by a damping effect of the oil film of the lubricating oil formed in these spaces and also to prevent seizure.

FIG. 7 is a detailed view of a floating bush bearing for rotatably supporting a rotation shaft of a high-speed rotary machine such as a turbocharger.

In FIG. 7, a turbocharger 0100 is formed by a pair of vane wheels 0102a and 0102b and a rotor shaft 0104 for integrally connecting the pair of vane wheels 0102a and 0102b. A floating bush bearing 0110 is formed by a bearing housing 0112 and a floating bush 0114 placed between the bearing housing 0112 and the rotor shaft 0104. The floating bush 0114 rotatably supports the rotor shaft 0104.

Oil passages 0116 and 0118 are provided in the bearing housing 0112 and the floating bush 0114, respectively. The lubricating oil is supplied from the bearing housing 0112 through the oil passages 0116 and 0118 to the space between the inner peripheral surface of the bearing housing 0112 and the outer peripheral surface of the floating bush 0114 and the space between the inner peripheral surface of the floating bush 0114 and the rotor shaft 0104.

The floating bush 0114 is rotatably arranged and is configured to co-rotate with the rotor shaft 0104 at a speed lower than the rotor shaft 0104 due to sliding resistance against the rotor shaft 0104.

The oil film composed of the lubricating oil is formed in these spaces so as to prevent seizure occurring at a sliding face in the spaces and damage (wear).

In JP 2009-156333 A (Patent Document 1), the width of the inner periphery of the floating bush on the compressor side, Lc is set smaller than the width of the inner periphery of the floating bush on the turbine side, Lt (Lc<Lt). Hence, a spring constant by an oil film on the floating bush bearing on the compressor side is smaller than a sprint constant by an oil film on the floating bush bearing on the turbine side. As a result, without an increase of an eccentricity ratio of the rotor shaft relative to the floating bush bearing on the turbine side subjected to a large bearing load, equilibrium is maintained between the floating bush bearing on the turbine side and the floating bush bearing on the compressor side and natural frequency caused by self-excited oscillation in a high frequency range decreases, thereby achieving noise reduction.

In JP 2007-46642A (Patent Document 2), a spiral groove is provided in at least one of an inner peripheral surface or an outer peripheral surface of a fully floating bearing and that, when the fully floating bearing is rotated, distribution of the pressure loaded on the inner or outer peripheral surface from fluid (lubricating oil) changes along the axial direction by the spiral groove formed in at least one of the inner peripheral surface or the outer peripheral surface. This change makes it difficult for the fully floating bearing to be in a stable state, thereby suppressing self-excited oscillation.

CITATION LIST

Patent Literature

[Patent Document 1] JP 2009-156333 A
[Patent Document 2] JP 2007-46642 A

SUMMARY

Technical Problem

In Patent Document 1, the width of the inner periphery of the floating bush on the compressor side, Lc is set smaller than the width of the inner periphery of the floating bush on the turbine side, Lt (Lc<Lt) so as to reduce the natural frequency caused by self-excited oscillation in the high frequency range decreases, thereby achieving noise reduction. However, the floating bush bearing on the compressor side and the floating bush bearing on the turbine side have different shapes and thus, the number of components increases. This results in increase in a management cost and a higher risk of misassembling.

In Patent Document 2, the spiral groove is provided in at least one of the inner and outer peripheral surfaces of the fully floating bearing. Therefore, it is a complicated work to form the groove and, in particular, the groove in the inner peripheral surface which has small inner diameter where the rotor shaft of the turbine rotor is fitted and the machining man hour increases. This results in higher component cost.

In view of the above issues, an object of the present invention is to improve oscillation stability when a turbine rotor revolves at a high speed, reduce the number of parts, and facilitate processing and assemblability by configuring a first floating bush bearing disposed on a compressor housing side and a second floating bush bearing disposed on a turbine housing side to have substantially the same shape and reducing the width of the inner peripheral width Li relative to the outer peripheral width Lo of each of the first and second floating bushes at the same ratio.

Solution to Problem

To achieve the object of the present invention, a bearing device for a turbocharger according to the present invention, comprises:

a bearing housing interposed between a turbine housing and a compressor housing of a turbocharger for pressurizing supply air to a combustion chamber of an internal combustion engine;

a rotor shaft of a turbine rotor arranged to pass through the bearing housing; and a first floating bush bearing interposed between the bearing housing and the rotor shaft, comprising a first floating bush and being disposed on a compressor housing side, the first floating bush having an oil supply hole which interconnects an outer peripheral surface and an inner peripheral surface and being configured to supply lubricating oil from the bearing housing to the outer peripheral surface and the inner peripheral surface;

a second floating bush bearing having the same configuration as the first floating bush bearing, comprising a second floating bush and being disposed on a turbine housing side, and each of the first and second floating bushes is configured so that an inner bearing width Li is formed smaller than an outer bearing width Lo at the same ratio.

According to the present invention, each of the first and second bushes is configured so that the inner bearing width Li is smaller than the outer bearing width Lo to reduce the co-rotation amount of the floating bush during the high-speed rotation of the rotor shaft and improve the oscillation stability during the high-speed rotation, thereby achieving the noise reduction effect.

Further, by configuring the first and second bushes so that the first and second bushes have the same ratio of the inner bearing width to the outer bearing width, viscosity resistance of the lubricating oil which occurs at the first and second bushes is the same, thereby achieving stable support of the rotor shaft.

As the first and second floating bushes have the same configuration, it is possible to reduce the number of parts, and facilitate processing and assemblability. As a result, the risk of misassembling can be lowered and stable processing quality and cost reduction can be achieved.

By configuring the outer bearing width larger than the inner bearing width, it is possible to maintain the damping effect on the floating bush bearing and the housing.

It is preferable in the present invention that a ratio Li/Lo of the outer bearing width Lo to the inner bearing width Li is set to satisfy a range of Lx/Lo<Li/Lo<0.5 where Lx is a minimum inner bearing width including a diameter φ of the oil supply hole (oil supply path).

In this configuration, it is possible to maintain the co-rotation amount of each floating bush at an appropriate rotation speed with respect to the rotation speed of the rotor shaft during high-speed rotation of the rotor shaft, and improve the rotation oscillation stability so as to obtain the noise reduction effect.

Further, if the minimum width is set smaller than the diameter φ of the oil supply hole, a tip of the oil supply path is removed to form an inclined surface of a cone shape. This causes the lubricating oil to flow directly in the axial direction of the rotor shaft from the oil supply hole φ. This minimizes the damping effect of the lubricating oil on the floating bush bearing and the rotor shaft.

It is preferable in the present invention that the outer peripheral surface of the floating bush bearing has a low friction treatment.

It is also preferable in the present invention that the low friction treatment includes Diamond Like Carbon coating or molybdenum disulfide coating on the outer peripheral surface of the floating bush.

It is preferable in the present invention that the low friction treatment includes surface texture (dimples or micro recesses) formed on the outer peripheral surface of the floating bush.

In such configurations, by providing the low friction treatment on the outer peripheral surface of the floating bush bearing to reduce the friction resistance between an outer peripheral bearing surface of the floating bush and the bearing housing, it is possible to start rotation of the floating bush at an early stage in the low-speed rotational range of the rotor shaft so as to reduce rotation resistance of the rotor shaft.

It is preferable in the present invention that the low friction treatment includes a groove circumferentially arranged on the outer peripheral surface of the floating bush, the groove communicating with the oil supply hole.

The lubricating oil fed from the lubricating oil path flows to a lower part of the floating bush via an edge groove, thereby filling a space between the floating bush and the bearing housing. As a result, the friction resistance at the start of rotation of can be suppressed.

Advantageous Effects

According to the present invention, by configuring each of the first and second bushes so that the inner bearing width is smaller than the outer bearing width, it is possible to maintain the co-rotation amount of each floating bush at an appropriate rotation speed with respect to the rotation speed of the rotor shaft during high-speed rotation of the rotor shaft, and improve the rotation oscillation stability so as to achieve the noise reduction effect.

Further, by forming the outer bearing width larger than the inner bearing width, it is possible to maintain the damping effect on the floating bush bearing and the housing.

Furthermore, as the first and second floating bushes have the same configuration, it is possible to reduce the number of parts, and facilitate processing and assemblability. As a result, the risk of misassembling can be lowered and stable processing quality and cost reduction can be achieved.

DETAILED DESCRIPTION

Figure 1:
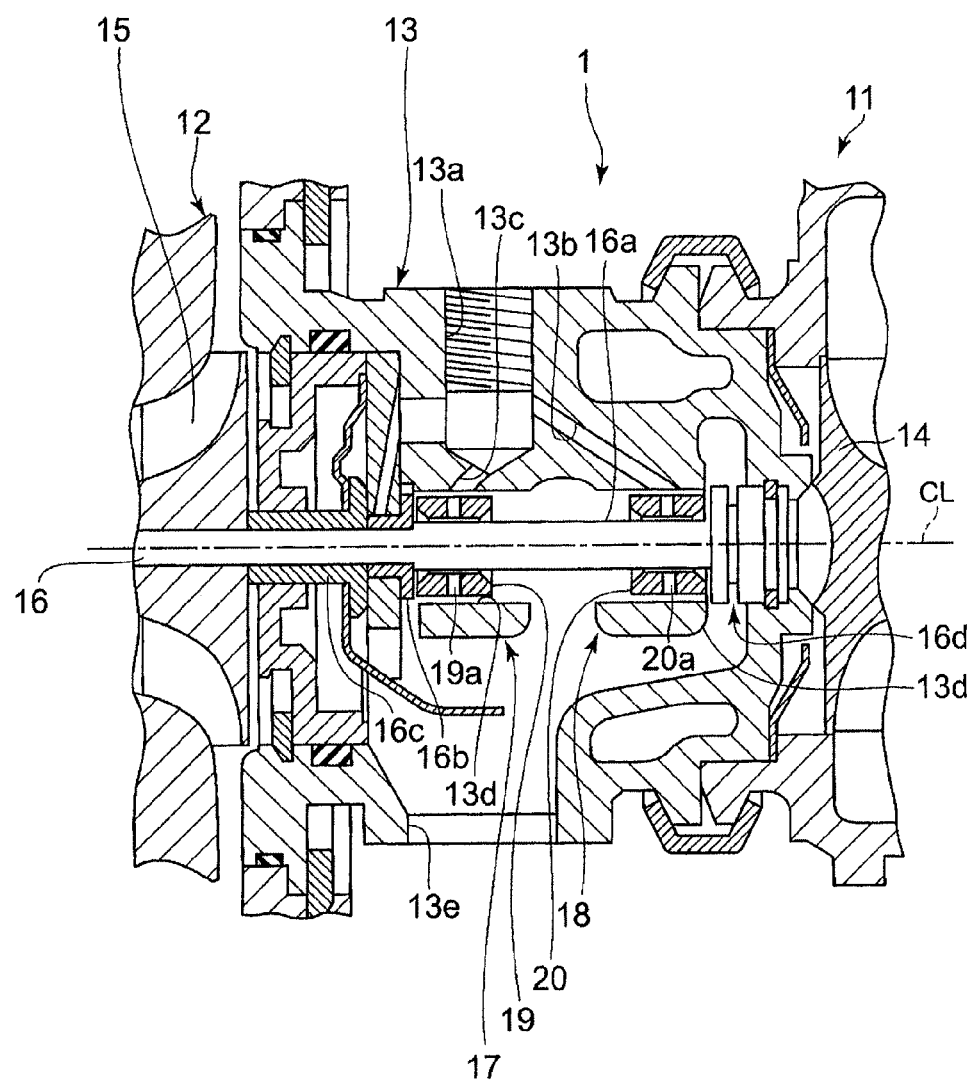
FIG. 1 is an enlarged cross-sectional view of a bearing device for a turbocharger according to embodiment of the present invention.

FIG. 1 illustrates a floating bush bearing which rotatably supports a high-speed turbocharger according to an embodiment of the present invention.

In FIG. 1, a turbocharger 1 is formed by an exhaust turbine 14 driven by exhaust gas of an internal combustion engine (hereinafter described as "engine"), a turbine housing 11 covering the exhaust turbine 14, a compressor impeller 15 for pressurizing intake air to the engine by a driving force of the exhaust turbine 14, a compressor housing 12 for covering the compressor impeller 15, a rotor shaft 16 for integrally connecting the exhaust turbine 14 and the compressor impeller 15, a bearing housing 15 interposed between the turbine housing 11 and the compressor housing 12 and rotatably supporting the rotor shaft 16, a thrust bearing 16b receiving a thrust load of the rotor shaft 16, and a sleeve 16c for positioning the compressor impeller 15 when fastening by a fastening member (not shown) from the compressor impeller 15 side.

In the bearing housing 13, a first floating bush bearing 17 and a second floating bush bearing 18 are arranged. The first floating bush bearing 17 is configured to rotatably support a compressor impeller side of the rotor shaft 16. The second floating bush bearing 18 is configured to rotatably support an exhaust turbine 14 side of the rotor shaft 16.

The first floating bush bearing 17 is formed by a bearing portion 13d formed in the bearing housing 13 and a first floating bush 19 which is fitted in the bearing portion 13d and in which the rotor shaft 16 is arranged.

The first floating bush 19 is formed into an annular shape and an oil supply path 19a is arranged to penetrate the first floating bush 19 from an outer peripheral surface to an inner peripheral surface.

The second floating bush bearing 48 is formed by a bearing portion 13d formed in the bearing housing 13 and a second floating bush 20 which is fitted in the bearing portion 13d and in which the rotor shaft 16 is arranged.

The second floating bush 20 is formed into an annular shape and an oil supply path 20a is arranged to penetrate the second floating bush 20 from an outer peripheral surface to an inner peripheral surface.

A pipe (not shown) is connected to a connection port 13a of the bearing housing 13 so that lubricating oil is supplied to the floating bush bearings 17 and 18.

A compressor-side lubricating oil passage 13c is an oil passage extending linearly and obliquely with respect to the first floating bush bearing 17 from the connection port 13a. The lubricating oil pumped to the first floating bush bearing 17 side is supplied to the first floating bush bearing 17 and between the first floating bush bearing 17 and the thrust bearing 16b so as to lubricate and cool these parts.

A turbine-side lubricating oil passage 13b is an oil passage extending linearly and obliquely with respect to the second floating bush bearing 18 from the connection port 13a. The lubricating oil pumped to the second floating bush bearing 18 side is supplied to the second floating bush bearing 18 and an increased diameter portion 16d of the rotor shaft 16 on the exhaust turbine 14 side so as to lubricate and cool these parts.

Next, the lubricating oil supplied to the first floating bush bearing 17 fills a gap between the bearing portion 13d and the first floating bush 19, passes through the oil supply path 19a penetrating the first floating bush 19 from the outer peripheral side to the inner peripheral side, and is finally supplied to between the first floating bush 19 and a shaft support part 16a of the rotor shaft 16.

Further, the lubricating oil supplied to the second floating bush bearing 18 fills a gap between the bearing portion 13d and the second floating bush 20, passes through the oil supply path 20a penetrating the second floating bush 20 from the outer peripheral side to the inner peripheral side, and is finally supplied to between the second floating bush 20 and the shaft support part 16a of the rotor shaft 16.

Each of the floating bushes 19 and 29 and the rotor shaft 16 is configured to be supported in a floating manner to the bearing housing 13 by means of an oil film composed of the lubricating oil.

The first floating bush bearing 17 (including the first floating bush 19) and the second floating bush bearing 18 (including the second floating bush 20) are explained above to avoid confusion, although they have the same configuration.

Hereinafter, "first floating bush bearing 17" is described as "floating bush bearing 17", and "second floating bush 19" is described as "floating bush 19".

Figure 2:
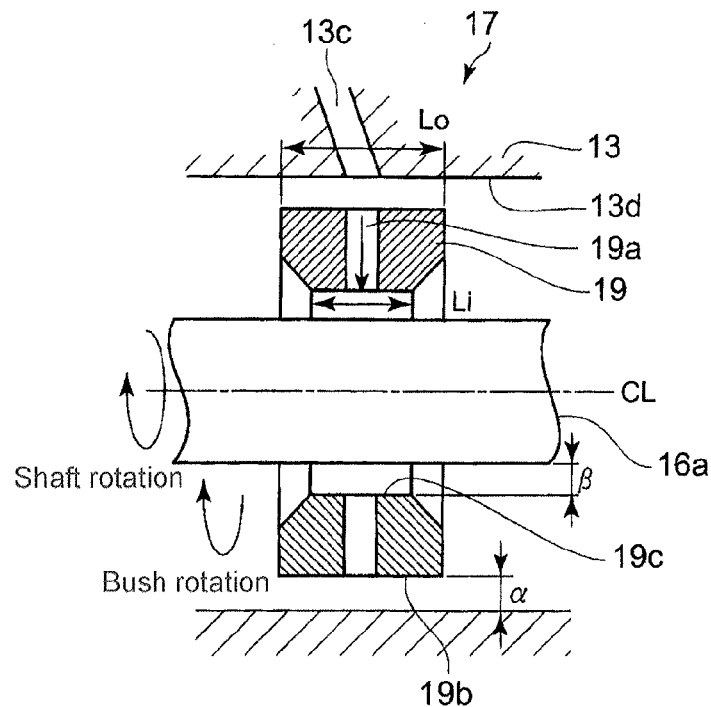
FIG. 2 is an enlarged cross-sectional view of a turbine rotor shaft and a floating bush according to an embodiment.

The floating bush bearing 17 of the present invention is illustrated in FIG. 2. The configuration of the floating bush bearing 17 is explained in reference to FIG. 2.

The floating bush 19 forming the floating bush bearing 17 is arranged to have a gap a so that an oil film is formed between the bearing portion 13d of the bearing housing 13 and an outer peripheral surface 19b of the floating bush 19.

The rotor shaft 16 is loosely fitted to the floating bush 19 with a gap 6 so that an oil film is formed between an inner peripheral surface 19c of the floating bush 19 and the shaft support part 16a of the rotor shaft 16.

To these gaps a, 6, the lubricating oil is fed through the compressor-side lubricating oil passage 13c within the bearing housing 13 (similarly to the turbine-side lubricating oil passage 13b).

When filling the gap a, the lubricating oil passes through the oil supply path 19a of the floating bush 19, filling the gap B between the inner peripheral surface 19c of the floating bush 19 and the shaft support part 16a, thereby supporting the rotor shaft 16 in a floating state with the oil film composed of the lubricating oil.

The floating bush 19 is configured so that an inner bearing width Li of an inner peripheral surface of the floating bush 19 is formed smaller than an outer bearing width Lo of an outer peripheral surface of the floating bush 19. The inner bearing width Li of the inner peripheral surface 19c of the floating bush 19 is formed by trimming both ends of the floating bush 19 inwardly into a cone shape. In this embodiment, both ends are cut by the same amount to be symmetrical with respect to the oil supply path 19a.

With this symmetrical configuration, it is possible to uniformly maintain a gap between the shaft support part 16a and a width-directional portion of the inner peripheral surface of the floating bush 19, which is symmetrical about the oil supply path 19a, thereby improving support stability.

In this embodiment, Lx is the minimum inner bearing width including a diameter $\phi$ of the oil supply path 19a (a lubricating oil path diameter $\phi$).

The minimum inner bearing width Lx is the minimum bearing width required to form an oil film thereon for supporting the shaft support part 16a by the inner peripheral surface 19c of the floating bush 19.

Lx (the minimum inner bearing width Lx=minimum contact width+diameter $\phi$ of oil supply path 19a) is influenced by weights of the exhaust turbine 14, the compressor impeller 15 and the rotor shaft 16, rotation balance, etc. Therefore, Lx may be determined in accordance with specifications of the turbocharger 1.

Figure 3:
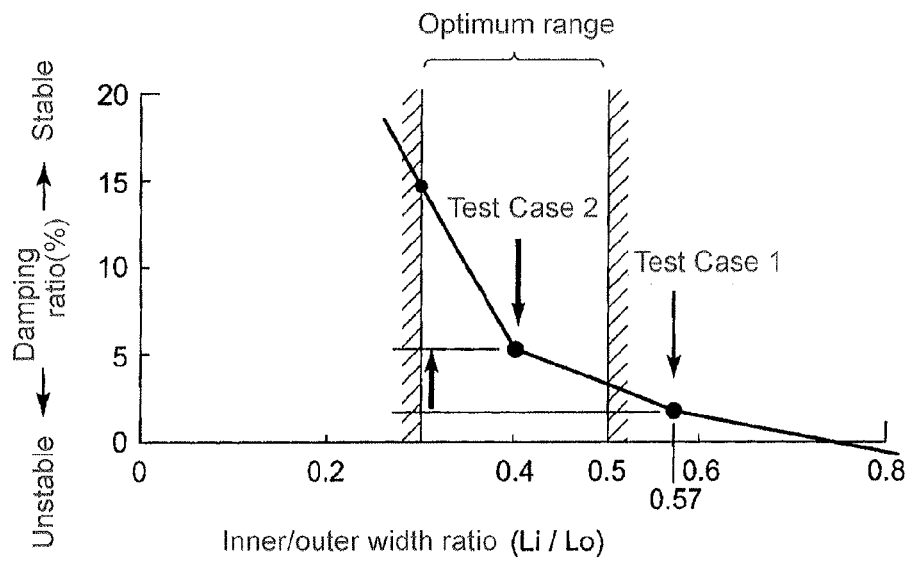
FIG. 3 is a characteristic diagram of a damping ratio indicating oscillation stability with respect to an inner/outer width ratio of the bush according to an embodiment.

FIG. 3 shows calculation of a damping ratio based on experiment results. The damping ratio % indicates support stability of the rotor shaft 16 with respect to an inner/outer width ratio Li/Lo of the floating bush 19.

The inner/outer width ratio Li/Lo is shown on the horizontal axis while the damping ratio % is shown on the longitudinal axis as a parameter defining the damping characteristic of the oil film. The higher damping ratio means better support stability of the rotation shaft 16.

The support of the rotor shaft 16 by the floating bush 19 tends to be unstable when the floating bush 19 is co-rotated at high speed. To prevent co-rotation of the floating bush 19 at high speed, the inner bearing width Li of the floating bush 19 is set smaller than the outer bearing width Lo of the floating bush 19 (Test Case 1 of FIG. 3).

To achieve performance improvement of the turbocharger such as durability improvement, supercharging pressure enhancement and oscillation noise reduction, an optimum range of the inner/outer width ratio Li/Lo is determined from this experiment result.

More specifically, as shown in FIG. 3, the inner/outer width ratio Li/Lo of the floating bush 19 is Lx/Lo<Li/Lo<0.5.

Lx is the minimum inner bearing width=minimum contact width+diameter $\phi$ of oil supply path 19a, as described above.

When Li/Lo>0.5 is the upper limit of this range, rotation of the rotor shaft 16 at high speed causes co-rotation of the floating bush 19 at increased speed, and the outer peripheral surface 19b of the floating bush 19 mainly becomes a sliding surface.

Thus, the support of the rotor shaft 16 tends to become unstable, and a noise and rotation resistance of the rotor shaft 16 becomes large.

When the ratio Li/Lo is 0.5, the damping ratio is improved from 2% of the conventional case to 3.5%, which results in the significantly improved damping ratio. Meanwhile, on the lower limit side, the bearing width Li of the inner peripheral surface 19c is set to the minimum inner bearing width Lx required to provide the hole diameter $\phi$ of the oil supply path 19a and to form an oil film.

In this embodiment, as the floating bush 19 is formed to satisfy Lx/Lo<Li/Lo<0.5, the co-rotation amount of the floating bush 19 can be optimized in the high-speed rotational range of the rotor shaft 16.

Therefore, during high-speed rotation of the rotor 16, by optimizing the co-rotation force applied to the floating bush 19 and reducing (optimizing) the co-rotation amount (the rotation amount) of the floating bush 19, the oil film formed between the inner peripheral surface 19c of the floating bush 19 and the rotor shaft 16 becomes the sliding surface for supporting rotation of the rotor shaft 16. As a result, the rotation sliding resistance and oscillation of the rotor shaft 16 can increase, and oscillation stability of the rotor shaft 16 can be improved.

Further, as the first floating bush bearing 17 and the second floating bush bearing 18 have the same configuration, viscosity resistance generated at the first and the second floating bushes is the same. As a result, the support of rotor shat 16 becomes stable and the risk of misassembling is reduce. This achieves improved quality and reduced production cost.

This also has a performance improvement effect, such as durability improvement, supercharging pressure enhancement and oscillation noise reduction of the turbocharger 1.

The ratio of the inner bearing width Li to the outer bearing width Lo of the floating bush 19 is set to Lx/Lo<Li/Lo<0.5 to achieve stable support of the rotor shaft 16 during the high speed rotation. To achieve performance improvement in the entire rotation range of the turbocharger, it is necessary to improve the supercharging pressure during the low speed rotation. During the low speed rotation of the turbocharger 1, it is advantageous to cause the floating bush 19 to co-rotate at an early stage and thus, it is necessary to improve starting performance of the turbocharger 1 by reducing the rotation resistance of the rotor shaft 16.

Figure 4A:
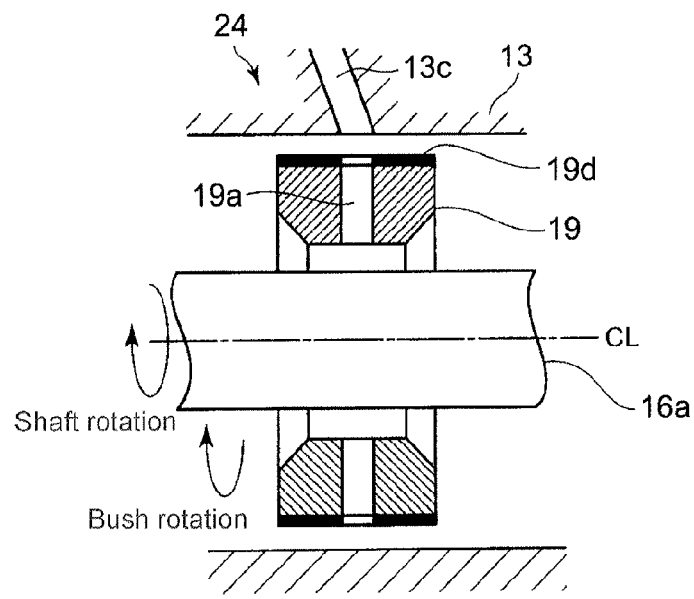
FIG. 4A illustrates a low friction treatment provided on an outer peripheral part of the floating bush according to a first embodiment.

FIG. 4A illustrates a low friction treatment provided on an outer peripheral part of the floating bush according to a first embodiment. FIG. 4A shows an enlarged cross-sectional view of the floating bush 19 provided with the low friction treatment on the outer peripheral part to cause co-rotation of the floating bush 19 at an early stage in the low-speed rotational range of the rotor shaft 16.

On the outer peripheral surface of the floating bush 19, DLC (Diamond Like Carbon) coating 19d is provided as the low friction treatment.

The DLC used here may be metal-containing DLC (WC: tungsten carbide, Si: silicon), hydrogen containing DLC, or the like.

The DLC coating is normally formed by, but not particularly limited to, chemical vapor deposition (CVD)

The DLC film is hard and fragile and thus, to improve adhesion of the film to a base material (the floating bush), a substrate material may be provided between the base material (the floating bush) and the DLC film. The substrate material may be a single layer of or multiple layers of combination of chromium (Cr), chromium nitride (CrN), titanium (Ti), titanium nitride (TiN), tungsten carbide (WC), tungsten (W), nickel (Ni), copper (Cu), iron (Fe), iron nitride (FeN), silicon (Si), silicon carbide (Sic), etc.

By composing the outer peripheral surface of the floating bush 19 of the low friction treatment 19d (e.g. DLC coating), it is possible to reduce sliding resistance between the outer peripheral surface and the oil film intervening between the bearing portion 13d and the floating bush 19.

Consequently, by starting co-rotation of the floating bush 19 at a stage where the rotation speed of the rotor shaft 16 is relatively low (the early stage), the rotation resistance of the floating bush 19 and the rotor shaft 16 is reduced even in the low-speed rotation range of the turbocharger 1 to obtain the effect of improving the supercharging pressure of the turbocharger 1.

Figure 4B:
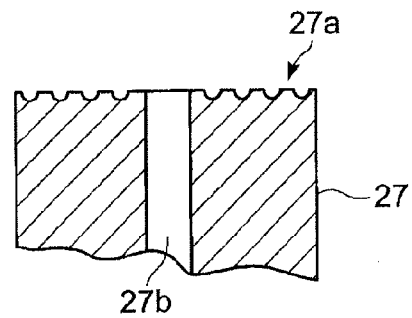
FIG. 4B illustrates a low friction treatment provided on an outer peripheral part of the floating bush according to a second embodiment.

FIG. 4B illustrates a low friction treatment of a second embodiment. In the second embodiment, dimples 27s are provided, as the low friction treatment in the outer peripheral surface of a floating bush 27. The lubricant oil is retained in depressions of the dimples 27a, thereby reducing sliding resistance between the outer peripheral surface of the floating bush 27 and the oil film which intervenes between the bearing portion 13d and the floating bush 27.

The dimples 27a may be formed, but not limit to, by fine particle shot peening.

In FIG. 4A, the dimples 27a have hemispheric shapes. This is, however, not restrictive and the dimples may have any shape such as a triangular pyramid as long as the shape allows the lubricating oil to retained in the dimples and achieves reduction of the friction coefficient.

Figure 4C:
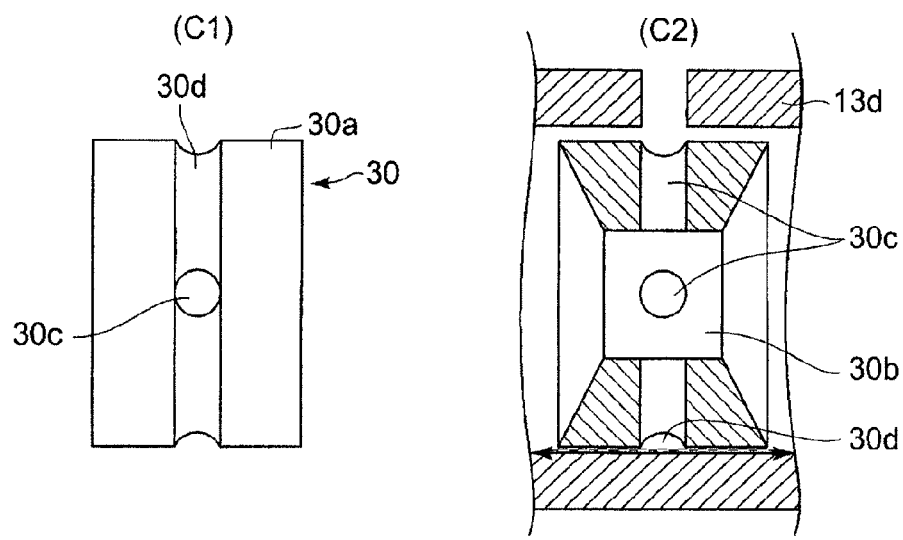
FIG. 4C illustrates a low friction treatment provided on an outer peripheral part of the floating bush according to a third embodiment in (C1) and shows a longitudinal cross-sectional view of (C1) in the radial direction in (C2).

FIG. 4C illustrates a low friction treatment of a third embodiment in (C1). FIG. 4C shows in (C2) a longitudinal cross-sectional view of (C1) in the radial direction. In a floating bush 30, a center groove 30d is provided in an outer peripheral surface 30a of the floating bush 30 over the entire circumference of outer peripheral surface 30a approximately at the center of the outer peripheral surface 30a in the bearing width direction. The center groove 30d communicates with an oil supply hole 30c which penetrates the floating bush 30 from the outer peripheral surface 30a to the inner peripheral surface 30b.

As illustrated in (C2) of FIG. 4C, the lubricating oil fed from the lubricating oil path 13c flows to a lower part of the floating bush 30 via the center groove 30d, thereby filling the space between the floating bush 30 and the bearing portion 13d. As a result, the friction resistance at the start of rotation of the floating bush 30 can be reduced.

Figure 4D:
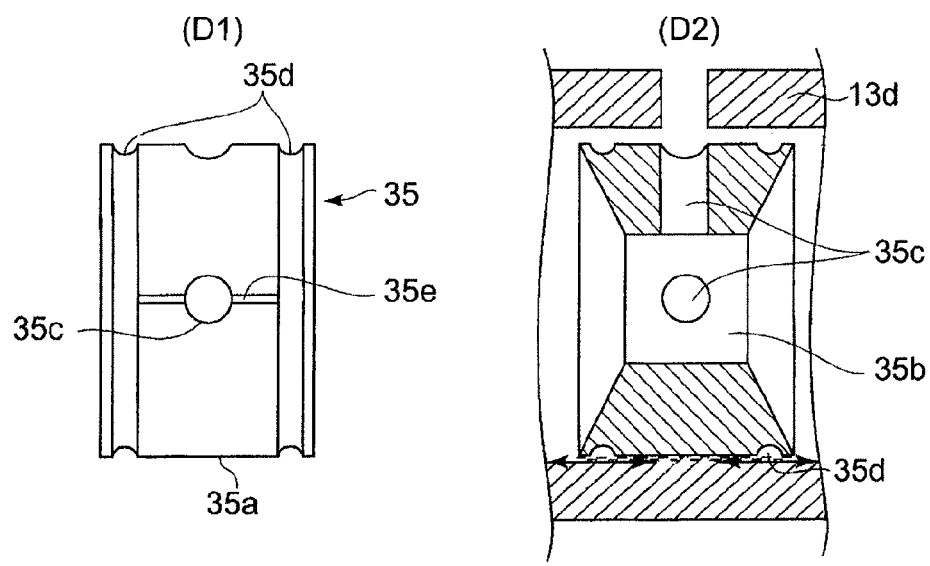
FIG. 4D illustrates a low friction treatment provided on an outer peripheral part of the floating bush according to a fourth embodiment in (D1) and shows a longitudinal cross-sectional view of (D1) in the radial direction in (D2).
Figure 5:
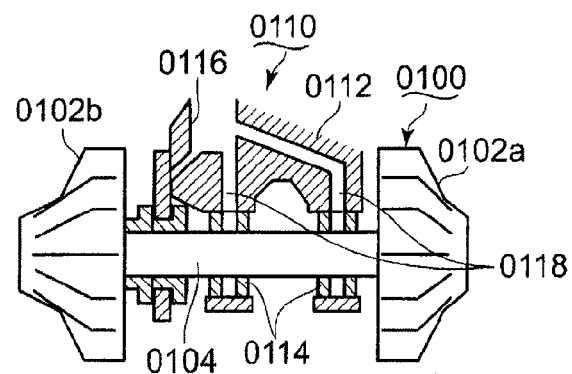
FIG. 5 is an illustration of related art.

FIG. 4D illustrates a low friction treatment of a fourth embodiment in (D1). FIG. 4D shows in (D2) a longitudinal cross-sectional view of (D1) in the radial direction. In a floating bush 35, an oil supply hole 35c is provided approximately at the center of the outer peripheral surface 35a of the floating bush 35 in the bearing width direction. The oil supply hole 35c penetrates the floating bush 35 from the outer peripheral surface 30a to the inner peripheral surface 30b.

On both sides of the oil supply hole 35c of the outer peripheral surface 35c in the bearing width direction, a pair of edge grooves 35d, 35d is formed over the entire circumference of the outer peripheral surface 35a. In each these edge grooves 35d, 35d, a transverse groove 35e is provided for each oil supply hole 35c so that the edge groove 35d communicates with the oil supply hole 35c.

As illustrated in (D2) of FIG. 4D, the lubricating oil fed from the lubricating oil path 13c flows to a lower part of the floating bush 35 (as indicated by arrows) via the edge grooves 35d, 35d, thereby filling the space between the floating bush 35 and the bearing portion 13d. As a result, the friction resistance during rotation start of the floating bush 35 can be suppressed.

According to the present invention, in each floating bush 19 (20), the inner bearing width is set smaller than the outer bearing width to reduce the co-rotation amount of the floating bush during the high-speed rotation and improve the oscillation stability, thereby achieving the noise reduction effect.

Further, by applying the low friction treatment to the outer peripheral part of the floating bush 19 (20), the sliding resistance during the low-speed rotation of the rotor shaft 16 can be improved.

As the floating bushes 19 (20) have the same ratio of the inner bearing width Li to the outer bearing width Lo, viscosity resistance of the lubricating oil is the same for the floating bushes 19 (20). As a result, the rotor shaft 16 can be stably support, and misassembling of the floating bushes 19 (20) can be eliminated, which achieves the cost reduction.

Further, by setting the ratio Li/Lo of the inner bearing width Li to the outer bearing width Lo to Lx/Lo<Li/Lo<0.5, the co-rotation amount of the floating bush 19 (20) is optimized with respect to the rotation speed of the rotor shaft 16. Thus, the co-rotation amount of each floating bush can be lowered during the high-speed rotation of the rotor shaft 16, and with improved oscillation stability, it is possible to obtain the noise reduction effect.

INDUSTRIAL APPLICABILITY

The above floating bearing is suitable as a bearing for a high-speed rotation shaft, and is suitable for use in a rotary machine, such as a turbocharger, revolving at high speed, so as to maintain favorable supply of the lubricant oil to the inner peripheral surface of the floating bush at low cost and to lower the noise and rotation resistance by stably supporting the rotation shaft.

REFERENCE SIGNS LIST

1 Turbocharger
11 Turbine housing
12 Compressor housing
13 Bearing housing
13a Connection port
13b, 13c Lubricating oil path
13d Bearing portion
14 Exhaust turbine
15 Compressor impeller
16 Rotor shaft
16a Support part
17 First floating bush bearing (floating bush bearing)
18 Second floating bush bearing
19, 27, 30, 35 First floating bush (floating bush)
19a Lubricating oil path
19b, 27b, 30c, 35c Outer peripheral surface
19c Inner peripheral surface
19d DLC coating
20 Second floating bush
30d Low friction treatment
Lo Outer bearing width
Li Inner bearing width

The invention claimed is:

1. A bearing device for a turbocharger, comprising:
a bearing housing interposed between a turbine housing and a compressor housing of a turbocharger for pressurizing supply air to a combustion chamber of an internal combustion engine;
a rotor shaft of a turbine rotor arranged to pass through the bearing housing; and
a first floating bush bearing configured to support the rotor rotatably and interposed between the bearing housing and the rotor shaft, comprising a first floating bush and being disposed on a compressor housing side, the first floating bush having an oil supply hole which interconnects an outer peripheral surface and an inner peripheral surface and being configured to supply lubricating oil from the bearing housing to the outer peripheral surface and the inner peripheral surface;
a second floating bush bearing configured to support the rotor rotatably and having the same configuration as the first floating bush bearing, comprising a second floating bush and being disposed on a turbine housing side,
wherein each of the first and second floating bushes is configured so that an inner bearing width Li is formed smaller than an outer bearing width Lo at the same ratio,
wherein the outer peripheral surface of each of the first and second floating bushes has a low friction treatment,
wherein each of the low friction treatments includes a groove formed over the entire circumference of the outer peripheral surface of the first and second floating bushes, the groove communicating with the oil supply hole, and
wherein the low friction treatment is formed by a pair of edge grooves formed over the entire circumference of the outer peripheral surface on both sides of the oil supply hole in the bearing width direction, and a transverse groove is provided for each oil supply hole so that the edge grooves communicate with the oil supply hole.

2. The bearing device for the turbocharger according to claim 1,
wherein a ratio Li/Lo of the outer bearing width Lo to the inner bearing width Li is set to satisfy a range of Lx/Lo<Li/Lo<0.5 where Lx is a minimum inner bearing width including a diameter $\phi$ of the oil supply hole.

* * * * *